(12) United States Patent
He

(10) Patent No.: US 12,074,821 B2
(45) Date of Patent: Aug. 27, 2024

(54) METHODS FOR UPLINK CHANNEL/SIGNAL TRANSMISSION, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 427 days.

(21) Appl. No.: 17/539,091

(22) Filed: Nov. 30, 2021

(65) Prior Publication Data
US 2022/0085953 A1 Mar. 17, 2022

Related U.S. Application Data

(63) Continuation of application No. PCT/CN2019/091392, filed on Jun. 14, 2019.

(51) Int. Cl.
*H04L 5/00* (2006.01)
*H04W 48/10* (2009.01)

(52) U.S. Cl.
CPC .......... *H04L 5/0053* (2013.01); *H04L 5/0048* (2013.01); *H04W 48/10* (2013.01)

(58) Field of Classification Search
CPC ... H04L 5/0053; H04L 5/0048; H04L 5/0023; H04L 5/0075; H04L 5/0092; H04W 48/10; H04W 56/0015; H04B 7/0404; H04B 7/0695; H04B 7/086; H04B 7/0617
See application file for complete search history.

(56) References Cited

U.S. PATENT DOCUMENTS

| | | | |
|---|---|---|---|
| 2019/0058538 A1 | 2/2019 | Sun et al. | |
| 2019/0141693 A1 | 5/2019 | Guo et al. | |
| 2019/0166513 A1 | 5/2019 | Lin | |
| 2020/0137741 A1* | 4/2020 | Zhou .................. | H04W 56/001 |

(Continued)

FOREIGN PATENT DOCUMENTS

| | | |
|---|---|---|
| CN | 109412769 A | 3/2019 |
| EP | 3471327 A1 | 4/2019 |

OTHER PUBLICATIONS

Chinese Office Action with English Translation for CN Application 202210061959.0 mailed Mar. 9, 2023. (18 pages).

(Continued)

*Primary Examiner* — Afshawn M Towfighi
(74) *Attorney, Agent, or Firm* — Young Basile Hanlon & MacFarlane, P.C.

(57) ABSTRACT

Methods for uplink channel/signal transmission, a terminal device, and a network device are provided. A method includes the following. A terminal device receives spatial relation indication information transmitted by a network device, where the spatial relation indication information is used to indicate a target synchronization signal block (SSB), and the spatial relation indication information includes a position index of the target SSB or quasi co-location (QCL) information of the target SSB. The terminal device determines spatial relation information of an uplink channel/signal according to target spatial relation information corresponding to the target SSB.

22 Claims, 4 Drawing Sheets

(56) References Cited

U.S. PATENT DOCUMENTS

2020/0220680 A1* 7/2020 Yamada ............... H04W 72/23
2022/0006580 A1* 1/2022 Cui ...................... H04L 5/0094

OTHER PUBLICATIONS

Communication pursuant to Article 94(3) EPC for EP Application 19933132.3 mailed Feb. 8, 2023. (6 pages).
3GPP TSG RAN WG1 #96bis R1-1904895, Xian China, OPPO, Enhancements to initial access procedure for NR-U, Apr. 8-12, 2019. (8 pages).
3GPP TSG RAN WG1 #97 R1-1906131, Reno, USA, Vivo, Discussion on enhancements to initial access procedure, 13th-17th, 2019. (9 pages).
Summons to attend oral proceedings pursuant to Rule 115(1) EPC for EP Application 19933132.3 mailed Jun. 9, 2023. (12 pages).
Communication pursuant to Article 94(3) EPC for EP Application 19933132.3 mailed Nov. 9, 2022. (9 pages).
Qualcomm Incorporated, Initial access and mobility procedures for NR unlicensed, 3GPP TSG RAN WG1 Meeting #97, R1-1907262, May 13-May 17, 2019. (16 pages).
3GPP TS 38.213 V15.2.0, Physical layer procedures for control (Release 15), (Jun. 2018), 99 pages.
3GPP TS 38.331 V15.2.1, Radio Resource Control (RRC) protocol specification, (Release 15) (Jun. 2018), 303 pages.
International Search Report with English Translation for PCT Application PCT/CN2019/091392 mailed Mar. 2, 2020 (4 pages).
Extended European Search Report for EP Application 19933132.3 mailed Apr. 29, 2022. (12 pages).
NTT Docomo, Inc., Enhancements to initial access procedure for NR-U, 3GPP TSG RAN WG1 #96, R1-1902790, Feb. 25-Mar. 1, 2019. (10 pages).
Samsung, Discussion on beam indication for UL transmission, 3GPP TSG RAN WG1 Meeting 90bis, R1-1717620, Oct. 9-13, 2017. (6 pages).

* cited by examiner

METHODS FOR UPLINK CHANNEL/SIGNAL TRANSMISSION, TERMINAL DEVICE, AND NETWORK DEVICE

CROSS-REFERENCE TO RELATED APPLICATION(S)

This application is a continuation of International Application No. PCT/CN2019/091392, filed on Jun. 14, 2019, the entire disclosure of which is incorporated herein by reference.

TECHNICAL FIELD

This disclosure relates to the field of communication, and more particularly to methods for uplink channel/signal transmission, a terminal device, and a network device.

BACKGROUND

In a new radio (NR) system, channel/signal transmission and reception of a terminal device have spatial characteristics. A network side configures the terminal device with spatial relation information between channels/signals, to indicate spatial relation information between a physical uplink control channel (PUCCH) or sounding reference signal (SRS) and a reference signal. The reference signal may be a synchronization signal (SS)/physical broadcast channel (PBCH) block ("synchronization signal block (SSB)" for short), a channel-state information reference signal (CSI-RS), or an SRS.

In addition, in NR, in spatial relation information between an uplink channel/signal and a reference signal configured by the network side, an SSB is identified by an SSB index. The SSB index can identify a position of the SSB or a quasi co-location (QCL) relationship between SSBs.

However, in an NR-unlicensed (NR-U) system, the meaning of the SSB index has changed. In this case, how to indicate an SSB that is in a spatial relation with an uplink channel/signal is a problem to be solved.

SUMMARY

In a first aspect, a method for uplink channel/signal transmission is provided. The method includes the following. A terminal device receives spatial relation indication information transmitted by a network device, where the spatial relation indication information is used to indicate a target synchronization signal block (SSB), and the spatial relation indication information includes a position index of the target SSB or quasi co-location (QCL) information of the target SSB. The terminal device determines spatial relation information of an uplink channel/signal according to target spatial relation information corresponding to the target SSB.

In a second aspect, a method for uplink channel/signal transmission is provided. The method includes the following. A network device transmits spatial relation indication information to a terminal device, where the spatial relation indication information is used to indicate a target SSB, the spatial relation indication information includes a position index of the target SSB or QCL information of the target SSB, and the spatial relation indication information is used for indicating that target spatial relation information corresponding to the target SSB is used for determining spatial relation information of an uplink channel/signal.

In a third aspect, a terminal device is provided. The terminal device includes a processor and a memory. The memory is configured to store computer programs. The processor is configured to invoke and execute the computer programs stored in the memory, to perform the method described in the first aspect or in any other implementation of the first aspect.

In a fourth aspect, a network device is provided. The network device includes a processor and a memory. The memory is configured to store computer programs. The processor is configured to invoke and execute the computer programs stored in the memory, to perform the method described in the second aspect or in any other implementation of the second aspect.

DETAILED DESCRIPTION

The following will describe technical solutions of implementations with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

The technical solutions of implementations are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, or a $5^{th}$ generation (5G) system.

Figure 1:
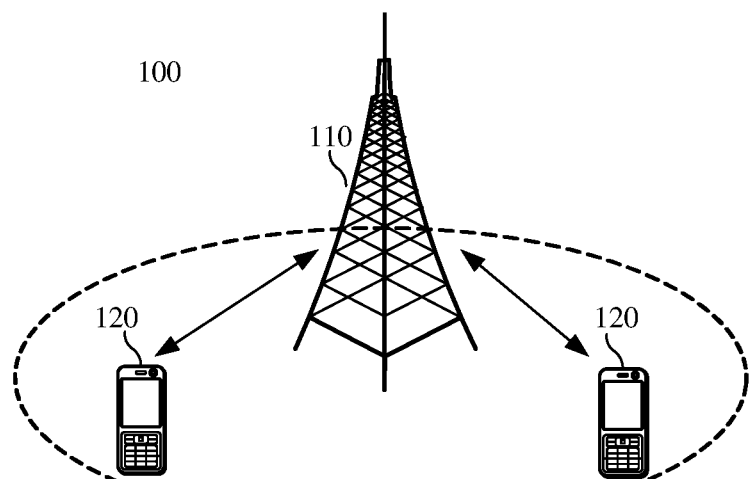
FIG. 1 is a schematic architectural diagram of a communication system provided in implementations of the disclosure.

For example, FIG. 1 illustrates a communication system 100 of implementations of the disclosure. The communication system 100 may include a network device 110. The network device 110 may be a device that communicates with a terminal device 120 (also referred to as a communication terminal or a terminal). The network device 110 can provide a communication coverage for a specific geographical area and communicate with terminal devices in the coverage area. The network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

Optionally, terminal devices 120 can communicate with each other by means of device to device (D2D) communication.

Optionally, the 5G system or 5G network can also be referred to as a new radio (NR) system or NR network.

FIG. 1 illustrates one example network device and two terminal devices. Optionally, the communication system 100 may also include multiple network devices, and there can be other numbers of terminal devices in a coverage area of each of the network devices, and implementations of the disclosure are not limited in this regard.

Optionally, the communication system 100 may further include other network entities such as a network controller, a mobile management entity, or the like, and implementations of the disclosure are not limited in this regard.

It should be understood that, in implementations of the disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

The following will explain the technical terms used herein.

(1) NR-Unlicensed (NR-U) System

Unlicensed spectrum is a spectrum specified by a country or region that can be used for communication between radio devices. This spectrum is usually regarded as a shared spectrum, that is, communication devices in different communication systems can use this spectrum without applying for exclusive spectrum authority from the government, as long as they meet regulatory requirements on this spectrum set by the country or region. In order to make various communication systems, which use an unlicensed spectrum for wireless communication, coexist in harmony in this spectrum, some countries or regions have specified regulatory requirements on use of unlicensed spectrum. For example, in European regions, a communication device needs to follow a "listen-before-talk (LBT)" principle, that is, before transmitting signals on an unlicensed spectrum channel, the communication device needs to perform channel listening first, and the communication device can transmit signals only when the channel listening indicates that the channel is idle. If the channel listening of the communication device on the unlicensed spectrum channel indicates that the channel is busy, the communication device cannot transmit signals. In order to ensure fairness, in one transmission, a duration for which the communication device uses the unlicensed spectrum channel for signal transmission cannot exceed a maximum channel occupancy time (MCOT).

(2) Synchronization Signal (SS)/Physical Broadcast Channel (PBCH) Block in an NR System Common channels and signals in an NR system, such as SSs and broadcast channels, need to cover a whole cell by multi-beam scanning to facilitate UE reception in the cell.

Multi-beam transmission of an SS is implemented by defining an SS/PBCH burst set. One SS/PBCH burst set contains one or more SS/PBCH blocks. One SS/PBCH block is used for carrying SSs and broadcast channels of one beam. Therefore, the SS/PBCH burst set may contain SSs of beams, where the number of the beams is equal to the number of SS/PBCH blocks in the cell ("SS/PBCH block number" for short). A maximum SS/PBCH block number may be represented by L, where L is related to a frequency band of a system. For example, for a frequency range up to 3 GHz (gigahertz), L is 4; for a frequency range from 3 GHz to 6 GHz, L is 8; for a frequency range from 6 GHz to 52.6 GHz, L is 64.

Figure 2:
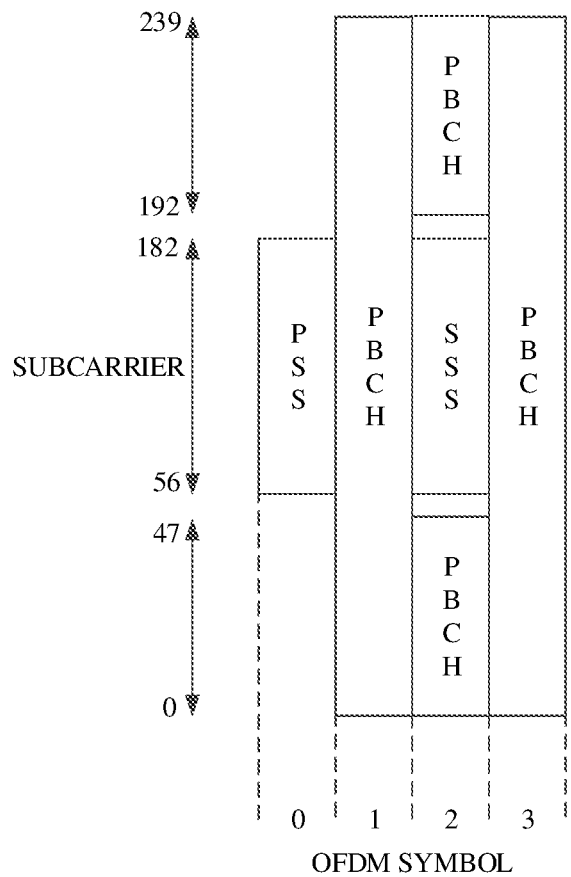
FIG. 2 is a schematic diagram of time-frequency resources occupied by one synchronization signal block (SSB) provided in implementations of the disclosure.

FIG. 2 is a schematic diagram of time-frequency resources occupied by one SS/PBCH block (hereinafter, "synchronization signal block (SSB)" for short). As illustrated in FIG. 2, one SSB may contain a primary synchronization signal (PSS) of one orthogonal frequency division multiplexing (OFDM) symbol ("one symbol PSS" for short), a secondary synchronization signal (SSS) of one OFDM symbol ("one symbol SSS" for short), and new radio access technology-physical broadcast channels (NR-PBCH) of two OFDM symbols ("two symbols NR-PBCH" for short), Time-frequency resources occupied by a PBCH may include a demodulation reference signal (DMRS) that is used for demodulation of the PBCH.

All SS/PBCH blocks in the SS/PBCH burst set are transmitted within a time window with a size of 5 ms (millisecond) ("5 ms time window" for short) and transmitted repeatedly at a certain period. The period can be configured by means of a higher-layer parameter, i.e., SSB timing. For example, the period can be 5 ms, 10 ms, 20 ms, 40 ms, 80 ms, 160 ms, etc. A UE can obtain an SSB index according to the SS/PBCH block (SSB) received. The SSB index corresponds to a relative position of the SSB in the 5 ms time window. According to the relative position of the SSB and half-frame indication information carried in a PBCH, the UE can obtain frame synchronization, where the SSB index can be indicated by a DMRS of the PBCH or information carried in the PBCH.

Figure 3:
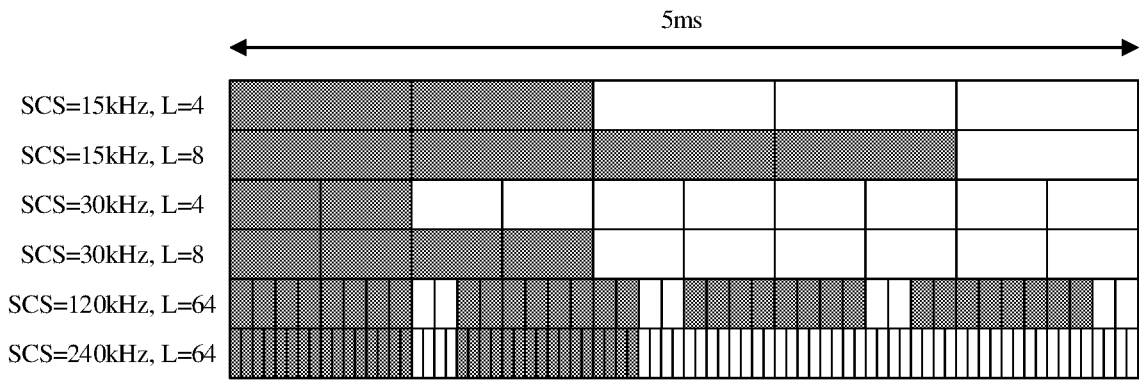
FIG. 3 is a slot distribution pattern of an SSB under different subcarrier spacings (SCS) provided in implementations of the disclosure.

FIG. 3 is a slot distribution pattern of an SSB under different subcarrier spacing (SCS). Taking a 15 kHz (kilohertz) SCS and L=4 as an example, one slot contains 14 symbols and can carry two SS/PBCH blocks. A total of 4 SS/PBCH blocks are distributed in first two slots in a 5 ms time window.

It should be understood that, the number of SSBs L is a maximum number of SSBs. In other words, the number of SSBs actually transmitted may be less than or equal to L. In an NR system, L is a maximum number of SSBs transmitted on a certain frequency band, and accordingly, a value range of the SSB index is [0, L−1]. The SSB index can be used for frame synchronization, and on the other hand, can be used for the UE to obtain a quasi co-location (QCL) relationship between SSBs. If SS/PBCH blocks received at different times have the same SSB index, they can be considered to be in a QCL relationship.

When two reference signals (such as SSBs) are in a QCL relationship, it can be considered that large-scale properties of each of the two reference signals can be inferred from each other, or are similar to each other, where the large-scale properties can include, for example, a Doppler delay, an average delay, a spatial reception (Rx) parameter, etc. During measurement, the UE can filter SSBs that are in a QCL relationship to obtain a beam-level measurement result.

(3) Discovery Reference Signal (DRS) in an NR-U System

In an NR-U system, for a primary cell (Pcell), a DRS transmitted by a network device can be used for access and measurement, where the DRS at least can include an SSB. Considering uncertainty of getting channel usufruct on an unlicensed spectrum, during transmission of the SSB, the network device may be unable to successfully transmit the SSB at a preset time point due to possibility of LBT failure. Therefore, a candidate position of the SSB is defined in NR-U. For example, in a time window of up to 5 ms, if an SCS for the SSB is 30 kHz, 20 candidate positions are defined; and if the SCS for the SSB is 15 kHz, 10 candidate positions are defined. If a maximum number of transmitted SSBs is Q, a base station determines, according to a detection result of LBT in a transmission window for the DRS, to use Q candidate positions among multiple candidate positions to transmit the DRS. The parameter Q may be configured for a terminal device by the network device, or may be specified in a protocol, which is not limited herein.

Figure 4:
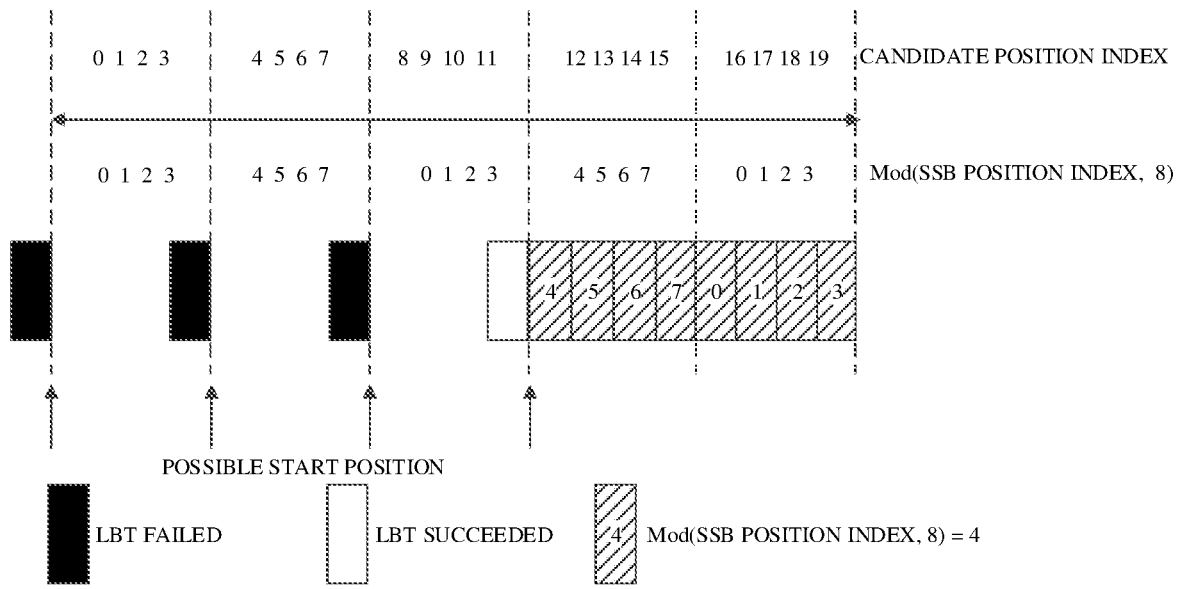
FIG. 4 is a schematic diagram illustrating listen-before-talk (LBT) at multiple candidate positions provided in implementations of the disclosure.

FIG. 4 is a schematic diagram illustrating LBT at multiple candidate positions. As illustrated in FIG. 4, for example, the SCS is 30 kHz, and 20 candidate positions are defined. The maximum number of transmitted SSBs Q is 8, and accordingly, a possible start position of each of the 8 SSBs may be any one of the 20 candidate positions illustrated in FIG. 4. Suppose that the base station performs LBT only at candidate positions with position indexes of 1, 4, 8, and 16 illustrated in FIG. 4, that is, the four positions are taken as the possible start positions of the 8 SSBs. As illustrated in FIG. 4, suppose that LBT performed by the base station before candidate position 12 succeeds, the base station begins to transmit SSB QCL index 0-7.

The meaning of an SSB QCL index in NR-U is different from that of an SSB index in NR. In NR, the SSB index can be used for obtaining both synchronization and a QCL relationship. However, in NR-U, while an SSB position index is used for obtaining synchronization, the SSB QCL index is used for obtaining a QCL relationship.

As illustrated in FIG. 4, according to a time point at which LBT succeeds, a position(s) at which an SSB(s) is actually transmitted ("actual transmit position" for short) may be any one or more of the 20 candidate positions. For an SSB transmission manner defined in NR-U, since the UE needs to obtain frame synchronization by an SSB that is received at a candidate transmit position, it is necessary to define an SSB position index for the candidate transmit position. As an example, the maximum number of transmitted SSBs Q=8, and the number of candidate positions Y=20. Since up to 8 SSBs may be transmitted at 20 candidate positions, a value range of an SSB position index carried in an SSB needs to be extended to 0-19, such that the UE can determine a position of the received SSB and further obtain frame synchronization. Since the maximum number of transmitted SSBs is 8, the value range of the SSB QCL index, which is used for obtaining a QCL relationship between SSBs, is 0-7, that is, the value range of the SSB position index is different from that of the SSB QCL index. For SSBs transmitted at different time points, if they have the same SSB QCL index, these SSBs can be considered to be in a QCL relationship. In other words, SSBs with different SSB QCL indexes are not in a QCL relationship. SSB QCL index=Mod (SSB position index, Q), where the value range of SSB QCL index is 0~Q−1.

Figure 5:
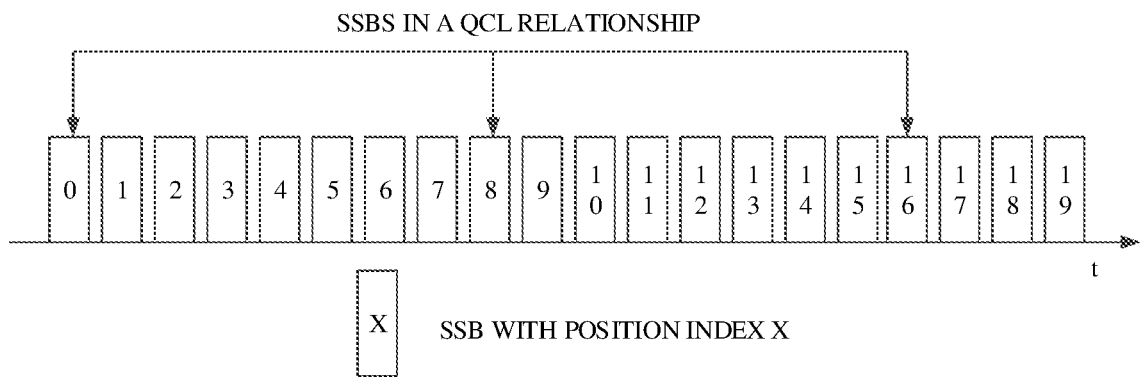
FIG. 5 is a schematic diagram illustrating a quasi co-location (QCL) relationship between SSBs having different position indexes provided in implementations of the disclosure.

FIG. 5 is a schematic diagram illustrating a QCL relationship between SSBs having different position indexes provided in implementations of the disclosure. As illustrated in FIG. 5, suppose that there are 20 candidate positions used for transmitting SSBs, the value range of the position index is 0-19, and the maximum number of transmitted SSBs is 8, that is, the value range of the SSB QCL index, which is used for obtaining a QCL relationship between SSBs, is 0-7. Therefore, there may exist multiple SSBs which have different position indexes but are in a QCL relationship. For example, as illustrated in FIG. 5, the three SSBs, of which SSB position indexes are respectively 0, 8, and 16, are in a QCL relationship.

(4) Spatial Relation Information Between Channels/Signals

In an NR system, channel/signal transmission and reception of the UE have spatial characteristics. A network side configures the UE with spatial relation information between channels/signals, to indicate spatial relation information between a physical uplink control channel (PUCCH) or sounding reference signal (SRS) and a reference signal. The reference signal may be an SSB, a channel-state information reference signal (CSI-RS), or an SRS. For example, when the network side indicates that a PUCCH has a spatial relation to an SSB, the UE can transmit the PUCCH by using the same spatial domain filter as that used for receiving the SSB. For another example, when the network side indicates that a target SRS has a spatial relation to an SSB, the UE can transmit the target SRS by using the same spatial domain filter as that used for receiving the SSB.

In NR, in the spatial relation information between an uplink channel/signal and a reference signal configured by the network side, the SSB is identified by an SSB index. The SSB index has a value range of 0~L-1 and is carried in the SSB. SSBs having different SSB indexes are not in a QCL relationship. A QCL relationship of the SSB with other SSB s can be directly obtained according to the SSB index.

However, in NR-U, the SSB carries the SSB position index. A QCL relationship is obtained according to the SSB QCL index, but the SSB QCL index is however not directly carried in the SSB, and instead, the SSB QCL index is calculated according to the SSB position index and the parameter Q. Therefore, in NR-U, if an SSB has a spatial relation to an uplink channel/signal, how to identify the SSB is currently a problem to be solved. Implementations of the disclosure provide a method for uplink channel/signal transmission, which is possible to solve such a problem.

Figure 6:
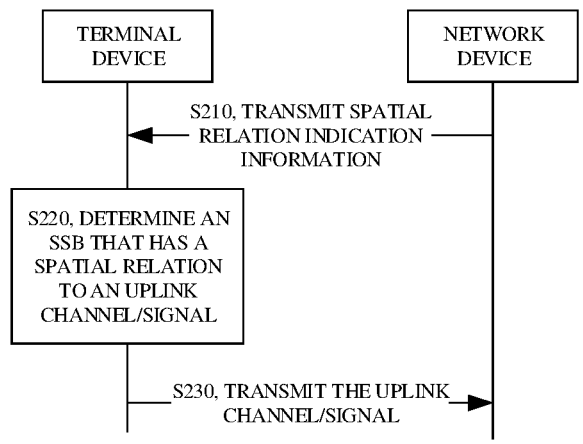
FIG. 6 is a schematic flowchart of a method for uplink channel/signal transmission provided in implementations of the disclosure.

FIG. 6 is a schematic flowchart of a method 200 for uplink channel/signal transmission provided in implementations of the disclosure. As illustrated in FIG. 6, the method 200 includes: S210, transmitting spatial relation indication information. Specifically, a network device transmits the spatial relation indication information to a terminal device, where the spatial relation indication information is used to indicate a reference signal which has a spatial relation to an uplink channel/signal.

It should be understood that, the method 200 of implementations of the disclosure is applicable to an unlicensed spectrum, for example, the method is applicable to an NR-U system, but implementations of the disclosure are not limited in this regard. In addition, the method 200 may be implemented by the terminal device or the network device. For example, the terminal device may be the terminal device illustrated in FIG. 1, and the network device may be the network device illustrated in FIG. 1.

Optionally, the uplink channel/signal of implementations of the disclosure may include a PUCCH and/or an SRS.

Optionally, the reference signal indicated by the spatial relation indication information of implementations of the disclosure may include at least one of: an SSB, a CSI-RS, or an SRS. The SSB of implementations of the disclosure refers to an SS/PBCH block.

It should be understood that, in implementations of the disclosure, the SSB is taken as an example of the reference signal, that is, the spatial relation indication information transmitted by the network device indicates an SSB which has a spatial relation to the uplink channel/signal. For the sake of differentiation, the SSB having a spatial relation to the uplink channel/signal herein is referred to as a target SSB. The target SSB may be any one SSB.

Specifically, the spatial relation indication information is used to indicate the target SSB, such that the terminal device can determine the target SSB according to the spatial relation indication information. The spatial relation indication information may include position information of the target SSB, for example, the position information of the target SSB may include a position index of the target SSB. Alternatively, the spatial relation indication information may include QCL information of the target SSB, for example, the QCL information of the target SSB may include a QCL index of the target SSB.

Optionally, as an implementation, the spatial relation indication information includes the position information of the target SSB. For instance, the position information of the target SSB may include the position index of the target SSB. The position index of the target SSB is used to indicate an index of a transmit position of the target SSB. As such, the terminal device can determine the target SSB according to the position index of the target SSB in the spatial relation indication information.

A value range of the position index of the target SSB represents possible transmit positions of the target SSB. In some implementations, the value range of the position index of the target SSB may be related to a size of a transmission window for a DRS, where the DRS includes the target SSB, and/or the value range of the position index of the target SSB may be related to an SCS.

For example, as illustrated in FIG. 4, if the size of a transmission window for the DRS is 5 ms, and an SCS of an SSB is 30 kHz, then the number of possible transmit positions of the SSB is 20, that is, the value range of the position index of the target SSB is 0-19. For another example, if the size of the transmission window for the DRS is 5 ms, and the SCS of the SSB is 15 kHz, then 10 candidate positions are defined, in other words, the number of possible transmit positions of the SSB is 10, that is, the value range of the position index of the target SSB is 0-9. The network device can select, by LBT, one or more possible transmit positions from all possible transmit positions (such as the 20 possible transmit positions or the 10 possible transmit positions described above), to transmit one or more target SSBs. The position index of the target SSB in the spatial relation indication information may be used for indicating an index of an actual transmit position of the target SSB, such that the terminal device can determine the position index of the target SSB and can further receive the target SSB.

Optionally, as another implementation, the spatial relation indication information is the QCL information of the target SSB. For instance, the QCL information of the target SSB may include the QCL index of the target SSB. The QCL information of the target SSB or the QCL index of the target SSB may be used for indicating a QCL relationship between the target SSB and other SSBs. For example, multiple SSBs that are in a QCL relationship have the same QCL index, and on the contrary, SSBs having different QCL indexes are not in a QCL relationship.

A value range of the QCL index of the target SSB is related to a maximum number Q of SSBs that are transmitted in one transmission window for a DRS and are not in a QCL relationship. For example, the value range of the QCL index of the target SSB is 0~Q-1.

As illustrated in FIG. 6, the method 200 further includes:
S220, determining an SSB that has a spatial relation to the uplink channel/signal. Specifically, the terminal device determines, according to the spatial relation indication information, the target SSB that has a spatial relation to the uplink channel/signal, and determines target spatial relation information corresponding to the target SSB.

Optionally, as an implementation, if the spatial relation indication information includes the position information of the target SSB, for example, the position information of the target SSB includes the position index of the target SSB, the terminal device can determine the target spatial relation information according to the position index of the target SSB.

It should be understood that, as to the position index of the target SSB, there exists at least one SSB which has a position index different from that of the target SSB, but the target SSB and the at least one SSB correspond to the same spatial relation information, and the target SSB and the at least one SSB are in a QCL relationship. In other words, the at least one SSB which is in a QCL relationship with the target SSB also corresponds to the target spatial relation information.

For example, the terminal device can determine spatial relation information corresponding to the position index of the target SSB as the target spatial relation information according to a correspondence relationship between position indexes of SSBs and spatial relation information. In the correspondence relationship between position indexes of SSBs and spatial relation information, there is a situation where position indexes of multiple SSBs in a QCL relationship correspond to the same spatial relation information. In other words, multiple SSBs in a QCL relationship may have different position indexes, but the multiple SSBs correspond to the same spatial relation information.

For another example, the terminal device can determine the QCL information of the target SSB according to the position index of the target SSB, and then determine spatial relation information corresponding to the QCL information of the target SSB as the target spatial relation information. For instance, the terminal device can determine the spatial relation information corresponding to the QCL information of the target SSB as the target spatial relation information according to a correspondence relationship between QCL information of SSBs and spatial relation information.

It should be understood that, a position index of an SSB can be used for determining a QCL index of the SSB. Taking the target SSB as an example, a relationship between the position index of the target SSB and the QCL index of the target SSB is related to parameter Q. In other words, the QCL index of the SSB is calculated according to the position index of the SSB. Specifically, the terminal device can determine the QCL index of the target SSB according to the following formula (1):

$$QCL = \mod(P, Q) \quad (1)$$

Wherein, QCL represents the QCL index of the target SSB. P represents the position index of the target SSB. Q is a parameter used for determining the QCL index of the target SSB. For example, the Q may represent a maximum number of SSBs that are not in a QCL relationship and transmitted in one transmission window for the DRS. Optionally, the parameter Q may be configured for the terminal device by the network device, or may be specified in a protocol, and implementations of the disclosure are not limited in this regard.

According to formula (1), for different SSB position indexes, there may exist multiple SSBs which correspond to different SSB position indexes but have the same QCL index, that is, the multiple SSBs corresponding to different SSB position indexes are in a QCL relationship. For example, a full value range of the SSB position index can be regarded as a set. The set may include multiple subsets. SSBs contained in the same subset have different position indexes but are in a QCL relationship, that is, SSBs in the same subset have the same QCL information. On the contrary, SSBs which belong to different subsets have different position indexes and are not in a QCL relationship, that is, SSBs in different subsets have different QCL information.

Optionally, as another implementation, if the spatial relation indication information includes the QCL information of the target SSB, for instance, the QCL information of the target SSB may include the QCL index of the target SSB, the terminal device can determine the target spatial relation information of the target SSB according to the QCL index of the target SSB.

It should be understood that, as to the QCL information of the target SSB, for example, the QCL index of the target SSB, multiple SSBs having the same QCL index are in a QCL relationship, and multiple SSBs having different QCL indexes are not in a QCL relationship. In addition, multiple SSBs having the same QCL index may have the same position index, or may have different position indexes. In other words, there may exist at least one SSB of which a position index is different from that of the target SSB, but the target SSB and the at least one SSB are in a QCL relationship and have the same QCL information. SSBs having the same QCL index correspond to the same spatial relation information, that is, the at least one SSB that is in a QCL relationship with the target SSB also corresponds to the target spatial relation information.

For example, the terminal device can determine spatial relation information corresponding to the QCL information of the target SSB as the target spatial relation information according to a correspondence relationship between QCL information of SSBs and spatial relation information. In the correspondence relationship between QCL information of SSBs and spatial relation information, SSB s having the same QCL information are in a QCL relationship, and SSBs that are in a QCL relationship correspond to the same spatial relation information.

For another example, the terminal device can determine the correspondence relationship between QCL information of SSBs and spatial relation information according to the correspondence relationship between position indexes of SSBs and spatial relation information. Then the terminal device can determine the spatial relation information corresponding to the QCL information of the target SSB as the target spatial relation information according to the correspondence relationship between QCL information of SSBs and spatial relation information. In the correspondence relationship between position indexes of SSBs and spatial relation information, there is a situation where position indexes of multiple SSBs in a QCL relationship correspond to the same spatial relation information. In other words, multiple SSBs that are in a QCL relationship may have different position indexes, but the position indexes of the multiple SSBs correspond to the same QCL information and therefore correspond to the same spatial relation information.

It should be understood that, a position index of an SSB can be used for determining a QCL index of the SSB. For example, according to formula (1) described above, a QCL index corresponding to a position index of any one SSB can be determined, which will not be elaborated herein for the sake of simplicity.

Optionally, as illustrated in FIG. 6, the method 200 further includes: S230, transmitting the uplink channel/signal. Specifically, the terminal device receives the spatial relation indication information, determines the target SSB according to the spatial relation indication information, and determines the target spatial relation information of the target SSB, such that the terminal device determines the target spatial relation information as spatial relation information of the uplink channel/signal to be transmitted. In other words, the target spatial relation information is used for determining spatial characteristics of transmission of the uplink channel/signal, such that the terminal device can transmit the uplink channel/signal based on the spatial characteristics that are determined according to the target spatial relation information.

For example, when the network device indicates, by means of spatial relation indication information, that a PUCCH has a spatial relation to the target SSB, the terminal device determines that spatial relation information corresponding to the target SSB is the same as that corresponding to the PUCCH. As such, the terminal device can use the same spatial domain filter as that used for receiving the target SSB to transmit the PUCCH.

For another example, when the network device indicates, by means of spatial relation indication information, that an SRS has a spatial relation to the target SSB, the terminal device determines that spatial relation information corresponding to the target SSB is the same as that corresponding to the SRS. As such, the terminal device can use the same spatial domain filter as that used for receiving the target SSB to transmit the SRS.

Therefore, according to the method provided in implementations of the disclosure, the terminal device receives the spatial relation indication information transmitted by the network device, where the spatial relation indication information includes position information of an SSB or QCL information of an SSB, such that the terminal device can correctly determine the SSB, and determine spatial characteristics of the SSB, thereby transmitting the uplink channel/signal according to the spatial characteristics, for example, transmitting a PUCCH or an SRS, which can improve reception performance of a PUCCH or an SRS.

It should be understood that, in various implementations of the disclosure, the size of the sequence number of each process described above does not mean the order of execution, and the execution order of each process should be determined by its function and internal logic, which shall not constitute any limitation on the implementation process of implementations of the disclosure.

The method for uplink channel/signal transmission of implementations of the disclosure has been described in detail above with reference to FIG. 1 to FIG. 6. The following will describe a terminal device and a network device of implementations of the disclosure with reference to FIG. 7 to FIG. 11.

Figure 7:
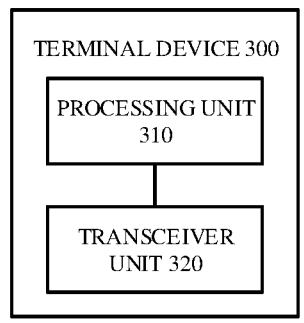
FIG. 7 is a schematic block diagram of a terminal device provided in implementations of the disclosure.

As illustrated in FIG. 7, a terminal device 300 of implementations of the disclosure includes: a processing unit 310 and a transceiver unit 320. Specifically, the transceiver unit 320 is configured to receive spatial relation indication information transmitted by a network device, where the spatial relation indication information is used to indicate a target SSB, and the spatial relation indication information includes a position index of the target SSB or QCL information of the target SSB. The processing unit 310 is configured to determine spatial relation information of an uplink channel/signal according to target spatial relation information corresponding to the target SSB.

Optionally, as an implementation, the processing unit 310 is configured to determine, according to a spatial domain filter used for receiving the target SSB, a spatial domain filter used for transmitting the uplink channel/signal, where the target spatial relation information includes the spatial domain filter used for receiving the target SSB.

Optionally, as an implementation, the target SSB and at least one SSB correspond to the same spatial relation information, the target SSB and the at least one SSB have different position indexes, and the target SSB and the at least one SSB are in a QCL relationship.

Optionally, as an implementation, the target SSB and the at least one SSB have the same QCL information.

Optionally, as an implementation, the processing unit 310 is further configured to determine the target spatial relation information corresponding to the target SSB.

Optionally, as an implementation, the spatial relation indication information includes the position index of the target SSB. The processing unit 310 is configured to determine spatial relation information corresponding to the position index of the target SSB as the target spatial relation information according to a correspondence relationship between position indexes of SSBs and spatial relation information.

Optionally, as another implementation, the spatial relation indication information includes the position index of the target SSB. The processing unit 310 is configured to operate as follows. The processing unit 310 is configured to determine the QCL information of the target SSB according to the position index of the target SSB. The processing unit 310 is configured to determine spatial relation information corresponding to the QCL information of the target SSB as the target spatial relation information according to a correspondence relationship between QCL information of SSB s and spatial relation information.

Optionally, as an implementation, the processing unit 310 is configured to determine a QCL index of the target SSB according to formula (1) described above, where the QCL information of the target SSB includes the QCL index of the target SSB. QCL represents the QCL index of the target SSB. P represents the position index of the target SSB. Q represents a maximum number of SSBs that are not in a QCL relationship and transmitted in one transmission window for a DRS.

Optionally, as an implementation, a value range of the position index of the target SSB is related to a size of a transmission window for a DRS, where the DRS includes the target SSB, and/or a value range of the position index of the target SSB is related to an SCS of an SS.

Optionally, as another implementation, the spatial relation indication information includes the QCL information of the target SSB. The processing unit 310 is configured to determine spatial relation information corresponding to the QCL information of the target SSB as the target spatial relation information according to a correspondence relationship between QCL information of SSB s and spatial relation information.

Optionally, as an implementation, a value range of the QCL index of the target SSB is related to the maximum number of SSBs that are not in a QCL relationship and transmitted in one transmission window for a DRS.

It should be understood that, the above and other operations and/or functions implemented by various units of the terminal device 300 are respectively intended for implementing corresponding operations of the terminal device in various methods illustrated in FIG. 1 to FIG. 6, which will not be repeated herein for the sake of simplicity.

Therefore, in the terminal device of implementations of the disclosure, the terminal device receives the spatial relation indication information transmitted by the network device, where the spatial relation indication information includes position information of an SSB or QCL information of an SSB, such that the terminal device can correctly determine the SSB, and determine spatial characteristics of the SSB, thereby transmitting the uplink channel/signal according to the spatial characteristics, for example, transmitting a PUCCH or an SRS, which can improve reception performance of a PUCCH or an SRS.

Figure 8:
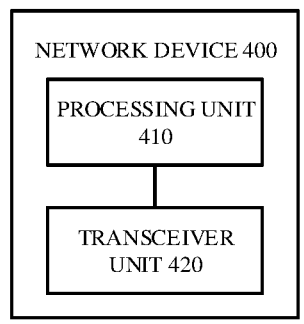
FIG. 8 is a schematic block diagram of a network device provided in implementations of the disclosure.

As illustrated in FIG. 8, a network device 400 of implementations of the disclosure includes: a processing unit 410 and a transceiver unit 420. The transceiver unit 420 is configured to transmit spatial relation indication information to a terminal device, where the spatial relation indication information is used to indicate a target SSB, the spatial relation indication information includes a position index of the target SSB or QCL information of the target SSB, and the spatial relation indication information is used for indicating that target spatial relation information corresponding to the target SSB is used for determining spatial relation information of an uplink channel/signal.

Optionally, as an implementation, the processing unit 410 is configured to determine the spatial relation information of the uplink channel/signal according to the target spatial relation information corresponding to the target SSB.

Optionally, as an implementation, the processing unit 410 is configured to determine, according to a spatial domain filter used for transmitting the target SSB, a spatial domain filter used for receiving the uplink channel/signal, where the target spatial relation information includes the spatial domain filter used for the network device to transmit the target SSB.

Optionally, as an implementation, the target SSB and at least one SSB correspond to the same spatial relation information, the target SSB and the at least one SSB have different position indexes, and the target SSB and the at least one SSB are in a QCL relationship.

Optionally, as an implementation, the target SSB and the at least one SSB have the same QCL information.

Optionally, as an implementation, the processing unit 410 is further configured to determine the target spatial relation information corresponding to the target SSB.

Optionally, as an implementation, the spatial relation indication information includes the position index of the target SSB. The processing unit 410 is configured to determine spatial relation information corresponding to the position index of the target SSB as the target spatial relation information according to a correspondence relationship between position indexes of SSBs and spatial relation information.

Optionally, as another implementation, the spatial relation indication information includes the position index of the target SSB. The processing unit 410 is configured to operate as follows. The processing unit 410 is configured to determine the QCL information of the target SSB according to the position index of the target SSB. The processing unit 410 is configured to determine spatial relation information corresponding to the QCL information of the target SSB as the target spatial relation information according to a correspondence relationship between QCL information of SSB s and spatial relation information.

Optionally, as an implementation, the processing unit 410 is configured to determine a QCL index of the target SSB according to formula (1) described above, where the QCL information of the target SSB includes the QCL index of the target SSB. QCL represents the QCL index of the target SSB. P represents the position index of the target SSB. Q represents a maximum number of SSBs that are not in a QCL relationship and transmitted in one transmission window for a DRS.

Optionally, as an implementation, a value range of the position index of the target SSB is related to a size of a transmission window for a DRS, where the DRS includes the target SSB, and/or a value range of the position index of the target SSB is related to an SCS of an SS.

Optionally, as another implementation, the spatial relation indication information includes the QCL information of the target SSB. The processing unit 410 is configured to determine spatial relation information corresponding to the QCL information of the target SSB as the target spatial relation information according to a correspondence relationship between QCL information of SSB s and spatial relation information.

Optionally, as an implementation, a value range of the QCL index of the target SSB is related to the maximum number of SSBs that are not in a QCL relationship and transmitted in one transmission window for a DRS.

It should be understood that, the above and other operations and/or functions implemented by various units of the network device 400 are respectively intended for implementing corresponding operations of the network device in various methods illustrated in FIG. 1 to FIG. 6, which will not be repeated herein for the sake of simplicity.

Therefore, in the network device of implementations of the disclosure, the network device transmits the spatial relation indication information to the terminal device, where the spatial relation indication information includes position information of an SSB or QCL information of an SSB, such that the terminal device can correctly determine the SSB, and determine spatial characteristics of the SSB, thereby transmitting the uplink channel/signal according to the spatial characteristics, for example, transmitting a PUCCH or an SRS, which can improve reception performance of a PUCCH or an SRS.

Figure 9:
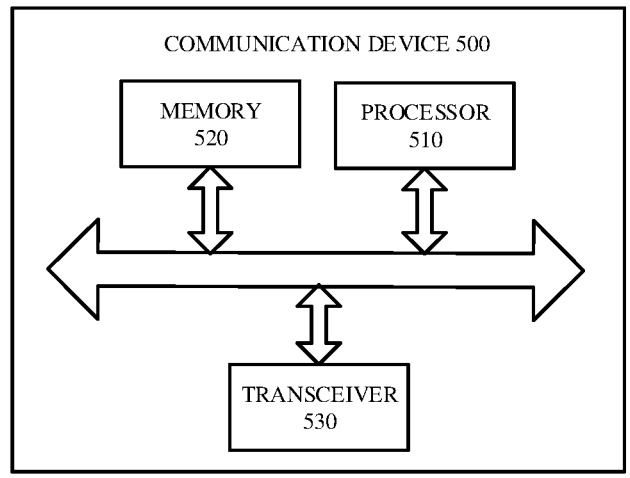
FIG. 9 is a schematic block diagram of a communication device provided in implementations of the disclosure.

FIG. 9 is a schematic structural diagram of a communication device 500 provided in implementations of the disclosure. The communication device 500 illustrated in FIG. 9 includes a processor 510. The processor 510 can invoke and execute computer programs stored in a memory to perform the method provided in implementations.

Optionally, as illustrated in FIG. 9, the communication device 500 can further include the memory 520. The processor 510 can invoke and execute the computer programs stored in the memory 520 to perform the method provided in implementations.

The memory 520 may be a separate device independent of the processor 510, or may be integrated into the processor 510.

Optionally, as illustrated in FIG. 9, the communication device 500 can further include a transceiver 530. The processor 510 can control the transceiver 530 to communicate with other devices, for example, to send information or data to other devices, or to receive information or data from other devices.

The transceiver 530 may include a transmitter and a receiver. The transceiver 530 may further include an antenna, where one or more antenna can be provided.

Optionally, the communication device 500 may be operable as the network device of implementations, and the communication device 500 can implement the operations performed by the network device described in the foregoing method implementations, which will not be repeated herein for the sake of simplicity.

Optionally, the communication device 500 may be operable as the mobile terminal/the terminal device of implementations, and the communication device 500 can implement the operations performed by the mobile terminal/the terminal device described in the foregoing method implementations, which will not be repeated herein for the sake of simplicity.

Figure 10:
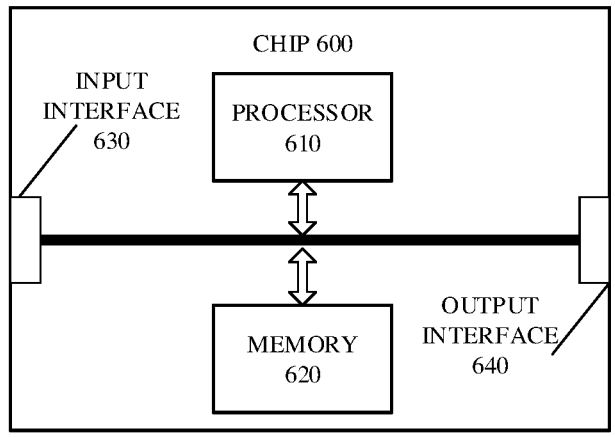
FIG. 10 is a schematic block diagram of a chip provided in implementations of the disclosure.

FIG. 10 is a schematic structural diagram of a chip provided in implementations of the disclosure. The chip 600 illustrated in FIG. 10 includes a processor 610. The processor 610 is configured to invoke and execute computer programs stored in a memory to perform the method provided in implementations.

Optionally, as illustrated in FIG. 10, the chip 600 further includes the memory 620. The processor 610 can invoke and execute the computer programs stored in the memory 620 to perform the method provided in implementations.

The memory 620 may be a separate device independent of the processor 610, or may be integrated into the processor 610.

Optionally, the chip 600 may further include an input interface 630. The processor 610 can control the input interface 630 to communicate with other devices or chips, for example, to acquire information or data sent by other devices or chips.

Optionally, the chip 600 may further include an output interface 640. The processor 610 can control the output interface 640 to communicate with other devices or chips, for example, to output information or data to other devices or chips.

Optionally, the chip is applicable to the network device of implementations. The chip can implement the operations performed by the network device described in the foregoing method implementations, which will not be repeated herein for the sake of simplicity.

Optionally, the chip is applicable to the mobile terminal/ the terminal device. The chip can implement the operations performed by the mobile terminal/the terminal device described in the foregoing method implementations, which will not be repeated herein for the sake of simplicity.

It should be understood that, the chip of implementations of the disclosure may also be referred to as a system-on-chip (SOC).

Figure 11:
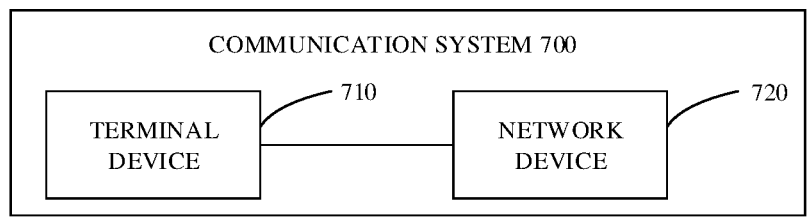
FIG. 11 is a schematic diagram of a communication system provided in implementations of the disclosure.

FIG. 11 is a schematic block diagram of a communication system 700 provided in implementations of the disclosure. As illustrated in FIG. 11, the communication system 700 includes a terminal device 710 and a network device 720.

The terminal device 710 can implement functions of the terminal device described in the foregoing method implementations, and the network device 720 can implement functions of the network device described in the foregoing method implementations, which will not be repeated herein for the sake of simplicity.

It should be understood that, the processor of implementations of the disclosure may be an integrated circuit chip with signal processing capabilities. During implementation, each step of the foregoing method may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations can be implemented or executed. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory of implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Implementations of the disclosure further provide a computer readable storage medium. The computer readable storage medium is configured to store computer programs.

Optionally, the computer readable storage medium is applicable to the network device of implementations. The computer programs, when executed, are operable with a computer to implement the operations performed by the network device described in the foregoing method implementations, which will not be repeated herein for the sake of simplicity.

Optionally, the computer readable storage medium is applicable to the mobile terminal/the terminal device. The computer programs, when executed, are operable with a computer to implement the operations performed by the mobile terminal/the terminal device described in the foregoing method implementations, which will not be repeated herein for the sake of simplicity.

Implementations of the disclosure further provide a computer program product. The computer program product includes computer program instructions.

Optionally, the computer program product is applicable to the network device of implementations. The computer program instructions, when executed, are operable with a computer to implement the operations performed by the network device described in the foregoing method implementations, which will not be repeated herein for the sake of simplicity.

Optionally, the computer program product is applicable to the mobile terminal/the terminal device. The computer program instructions, when executed, are operable with a computer to implement the operations performed by the mobile terminal/the terminal device described in the foregoing method implementations, which will not be repeated herein for the sake of simplicity.

Implementations of the disclosure further provide a computer program.

Optionally, the computer program is applicable to the network device of implementations. The computer program, when executed by a computer, is operable with the computer to implement the operations performed by the network device described in the foregoing method implementations, which will not be repeated herein for the sake of simplicity.

Optionally, the computer program is applicable to the mobile terminal/the terminal device. The computer program, when executed by a computer, is operable with the computer to implement the operations performed by the mobile terminal/the terminal device described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the functional units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for uplink channel/signal transmission, comprising:
   receiving, by a terminal device, spatial relation indication information transmitted by a network device, wherein the spatial relation indication information is used to indicate a target synchronization signal block (SSB), and the spatial relation indication information comprises one of a position index of the target SSB or quasi co-location (QCL) information of the target SSB; and
   determining, by the terminal device, spatial relation information of an uplink channel/signal according to target spatial relation information corresponding to the target SSB;
   wherein
   a value range of the position index of the target SSB is related to a size of a transmission window for a DRS, wherein the DRS comprises the target SSB; and/or
   a value range of the position index of the target SSB is related to a subcarrier spacing (SCS) of a synchronization signal (SS).

2. The method of claim 1, wherein determining, by the terminal device, the spatial relation information of the uplink channel/signal according to the target spatial relation information corresponding to the target SSB comprises:
   determining, by the terminal device, according to a spatial domain filter used for receiving the target SSB, a spatial domain filter used for transmitting the uplink channel/signal, wherein the target spatial relation information comprises the spatial domain filter used for receiving the target SSB.

3. The method of claim 1, wherein the target SSB and at least one SSB correspond to the same spatial relation information, the target SSB and the at least one SSB have different position indexes, and the target SSB and the at least one SSB are in a QCL relationship.

4. The method of claim 3, wherein the target SSB and the at least one SSB being in the QCL relationship means that the target SSB and the at least one SSB have the same QCL information.

5. The method of claim 1, further comprising:
determining, by the terminal device, the target spatial relation information corresponding to the target SSB.

6. The method of claim 5, wherein the spatial relation indication information comprises the QCL information of the target SSB, and
determining, by the terminal device, the target spatial relation information corresponding to the target SSB comprises:
determining, by the terminal device, spatial relation information corresponding to the QCL information of the target SSB as the target spatial relation information according to a correspondence relationship between QCL information of SSBs and spatial relation information.

7. The method of claim 6, wherein a value range of a QCL index of the target SSB is related to a maximum number of SSBs that are not in a QCL relationship and transmitted in one transmission window for a DRS.

8. A method for uplink channel/signal transmission, comprising:
transmitting, by a network device, spatial relation indication information to a terminal device, wherein the spatial relation indication information is used to indicate a target SSB, the spatial relation indication information comprises one of a position index of the target SSB or QCL information of the target SSB, and the spatial relation indication information is used for indicating that target spatial relation information corresponding to the target SSB is used for determining spatial relation information of an uplink channel/signal; and
determining, by the network device, the spatial relation information of the uplink channel/signal according to the target spatial relation information corresponding to the target SSB;
wherein
a value range of the position index of the target SSB is related to a size of a transmission window for a DRS, wherein the DRS comprises the target SSB; and/or
a value range of the position index of the target SSB is related to a subcarrier spacing (SCS) of a synchronization signal (SS).

9. The method of claim 8, wherein determining, by the network device, the spatial relation information of the uplink channel/signal according to the target spatial relation information corresponding to the target SSB comprises:
determining, by the network device, according to a spatial domain filter used for transmitting the target SSB, a spatial domain filter used for receiving the uplink channel/signal, wherein the target spatial relation information comprises the spatial domain filter used for the network device to transmit the target SSB.

10. The method of claim 8, further comprising:
determining, by the network device, the target spatial relation information corresponding to the target SSB.

11. The method of claim 10, wherein the spatial relation indication information comprises the QCL information of the target SSB, and
determining, by the network device, the target spatial relation information corresponding to the target SSB comprises:
determining, by the network device, spatial relation information corresponding to the QCL information of the target SSB as the target spatial relation information according to a correspondence relationship between QCL information of SSBs and spatial relation information.

12. The method of claim 11, wherein a value range of a QCL index of the target SSB is related to a maximum number of SSBs that are not in a QCL relationship and transmitted in one transmission window for a DRS.

13. A terminal device, comprising:
a transceiver;
a processor; and
a memory configured to store computer programs which, when executed by the processor, are operable with the transceiver to receive spatial relation indication information transmitted by a network device, wherein the spatial relation indication information is used to indicate a target synchronization signal block (SSB), and the spatial relation indication information comprises one of a position index of the target SSB or quasi co-location (QCL) information of the target SSB; the computer programs, when executed by the processor, are further operable with the processor to determine spatial relation information of an uplink channel/signal according to target spatial relation information corresponding to the target SSB;
wherein
a value range of the position index of the target SSB is related to a size of a transmission window for a DRS, wherein the DRS comprises the target SSB; and/or
a value range of the position index of the target SSB is related to a subcarrier spacing (SCS) of a synchronization signal (SS).

14. The terminal device of claim 13, wherein the computer programs, when executed by the processor, are further operable with the processor to:
determine, according to a spatial domain filter used for receiving the target SSB, a spatial domain filter used for transmitting the uplink channel/signal, wherein the target spatial relation information comprises the spatial domain filter used for receiving the target SSB.

15. The terminal device of claim 13, wherein the computer programs, when executed by the processor, are further operable with the processor to:
determine the target spatial relation information corresponding to the target SSB.

16. The terminal device of claim 15, wherein the spatial relation indication information comprises the QCL information of the target SSB, and the computer programs, when executed by the processor, are further operable with the processor to:
determine spatial relation information corresponding to the QCL information of the target SSB as the target spatial relation information according to a correspondence relationship between QCL information of SSBs and spatial relation information.

17. The terminal device of claim 16, wherein a value range of a QCL index of the target SSB is related to a maximum number of SSBs that are not in a QCL relationship and transmitted in one transmission window for a DRS.

18. A network device, comprising:
a transceiver;
a processor, and
a memory configured to store computer programs which, when executed by the processor, are operable with the transceiver to transmit spatial relation indication information to a terminal device, wherein the spatial relation indication information is used to indicate a target SSB, the spatial relation indication information comprises one of a position index of the target SSB or QCL information of the target SSB, and the spatial relation indication information is used for indicating that target spatial relation information corresponding to the target SSB is used for determining spatial relation information of an uplink channel/signal, and the computer programs, when executed by the processor, are further operable with the processor to determine the spatial relation information of the uplink channel/signal according to the target spatial relation information corresponding to the target SSB;

wherein a value range of the position index of the target SSB is related to a size of a transmission window for a DRS, wherein the DRS comprises the target SSB; and/or a value range of the position index of the target SSB is related to a subcarrier spacing (SCS) of a synchronization signal (SS).

19. The network device of claim 18, wherein the computer programs, when executed by the processor, are further operable with the processor to:

determine, according to a spatial domain filter used for transmitting the target SSB, a spatial domain filter used for receiving the uplink channel/signal, wherein the target spatial relation information comprises the spatial domain filter used for the network device to transmit the target SSB.

20. The network device of claim 18, wherein the computer programs, when executed by the processor, are further operable with the processor to:

determine the target spatial relation information corresponding to the target SSB.

21. The network device of claim 20, wherein the spatial relation indication information comprises the QCL information of the target SSB, and the computer programs, when executed by the processor, are further operable with the processor to:

determine spatial relation information corresponding to the QCL information of the target SSB as the target spatial relation information according to a correspondence relationship between QCL information of SSBs and spatial relation information.

22. The network device of claim 21, wherein a value range of a QCL index of the target SSB is related to a maximum number of SSBs that are not in a QCL relationship and transmitted in one transmission window for a DRS.

* * * * *